United States Patent [19]

Klobucar

[11] Patent Number: 5,398,513
[45] Date of Patent: Mar. 21, 1995

[54] REGENERATIVE VAPOR CONDENSER

[76] Inventor: Joseph M. Klobucar, 12111 Arrowhead Ct., Plymouth, Mich. 48170-3602

[21] Appl. No.: 168,639

[22] Filed: Dec. 16, 1993

[51] Int. Cl.$^6$ .............................................. F25J 3/04
[52] U.S. Cl. ........................................ 62/18; 95/115; 96/146
[58] Field of Search ................. 62/18; 95/115; 96/146

[56] References Cited

U.S. PATENT DOCUMENTS

| | | | |
|---|---|---|---|
| 4,414,007 | 8/1983 | Bucchianeri | 62/18 |
| 4,425,142 | 1/1984 | Mann | 62/18 |
| 5,156,657 | 10/1992 | Jain et al. | 62/18 |
| 5,220,796 | 6/1993 | Kearns | 62/18 |

Primary Examiner—Ronald C. Capossela

[57] ABSTRACT

The present invention is a regenerative vapor condenser for removing condensable vapors from a mixture of the vapors and another gas. The regenerative vapor condenser comprises two regenerator systems, a heat exchanger, and a valve mechanism. Each regenerator system comprises a regenerator for storing and releasing heat, and a phase separator for separating gas from solid and liquid phases. During operation one regenerator system operates in heating mode and one regenerator system operates in cooling mode. The vapor-gas mixture is directed by a valve system downward through the regenerator on cooling mode wherein the vapor-gas mixture is cooled by heat transfer to the cool regenerator media to below the dew point of the vapor causing the vapor to condense into a liquid or solid phase. The gas and condensed vapors exit the regenerator on cooling mode and enter the phase separator on cooling mode from where the gasses are directed into the heat exchanger and the condensed vapors are directed to a collection vessle. The gasses pass through the heat exchanger wherein they may be further cooled and are then passed by way of the phase seperator on warming mode into the regenerator on warming mode. The gasses are warmed in the regenerator on warming mode and are then vented by way of the valve system.

5 Claims, 2 Drawing Sheets

REGENERATIVE VAPOR CONDENSER

BACKGROUND OF THE INVENTION

The present invention relates to an apparatus for removing a condensable vapor from a mixture of condensable vapor and non-condensable gas and a method of using such an apparatus.

There are many important industrial processes where is it desirable to separate condensable vapors from a mixture with non-condensable gas. Two examples are, application of solvent based paints where solvent vapors are emitted with the exhaust air from the painting area or the drying oven, and filling of petroleum storage tanks where evaporated vapors are displaced from the tank volume during filling. In these processes it is often desirable to separate the condensable vapor from the vapor-gas mixture because the condensed vapor can be re-used, or because the vapor would have some adverse impact on the environment if released into the atmosphere.

One commonly used method to separate condensable vapors from vapor-gas mixtures is condensation that is achieved by cooling the mixture below the dew point of the vapor. In general the use of condensation for emission control or vapor recovery has been limited to sources where the volume of vapor-gas mixture is small (under approximately 100 cubic feet per minute) or the concentration of vapor in the mixture is high (above approximately 1% by volume). This is due to the fact that a large amount of energy is needed to cool the gas fraction of the mixture and no cost effective method has been developed to recover this energy.

A desiccant/refrigerated condensation vapor recovery system disclosed in U.S. Pat. No. 5,006,138 includes a "heat exchanger" to re-use cooling energy from the gasses exiting the system to cool the vapor-gas mixture entering the system. In this patent the heat exchanger cools the air to approximately 0° F., however because many applications require temperatures below $-100°$ F. to recover a sufficient portion of the vapors, the amount of energy saved by this heat exchanger is only a small fraction of the total cooling demand.

SUMMARY OF THE INVENTION

The present invention is an apparatus for condensing and collecting condensable vapor from a mixture of condensable vapor and gas by lowering the temperature of the vapor-gas mixture below the dew point of the vapor. The regenerative vapor condenser comprises two similar regenerator systems, a heat exchanger, and a valve mechanism. Each regenerator system operates in either heating or cooling modes and comprises a regenerator for storing and releasing heat, and a phase separator for separating gas from solid and liquid phases.

The regenerative vapor condenser operates as follows. The vapor-gas mixture flows under pressure into the valve mechanism where it is directed downward through the regenerator on cooling mode. In the regenerator on cooling mode the vapor-gas mixture is cooled by heat transfer to the cool regenerator media to below the dew point of the vapor causing the vapor to condense into a liquid or solid phase. The gas and condensed vapors exit the regenerator on cooling mode and enter the phase separator on cooling mode from where the gasses are directed into the heat exchanger and the condensed vapors are directed to a collection vessel. The gasses pass through the heat exchanger wherein they may be further cooled and are then passed by way of the phase seperator on warming mode into the regenerator on warming mode. The gasses are warmed in the regenerator on warming mode and are then directed to a gas vent by way of the valve mechanism. As the system operates the regenerator on cooling mode becomes progressively warmer, starting at the point where the vapor-gas mixture is entering and progressing in the direction of gas flow while the regenerator on warming mode becomes cooler starting at the point were the gasses are entering and progressing in the direction of gas flow. This continues until the originally cool regenerator is completely warm and the originally warm regenerator is completely cool, at this time the valve system reverses the flow of vapor-gas mixture through the system and the regenerator system originally in cooling mode operates in warming mode and the regenerator system originally in warming mode switches to cooling mode. A system of this type may be designed such that the purified gas exits at nearly the same temperature as the incoming vapor-gas mixture. This results in very little energy is wasted cooling the gas fraction of the vapor-gas mixture.

DETAILED DESCRIPTION OF A PREFERRED EMBODIMENT

Figure 1:
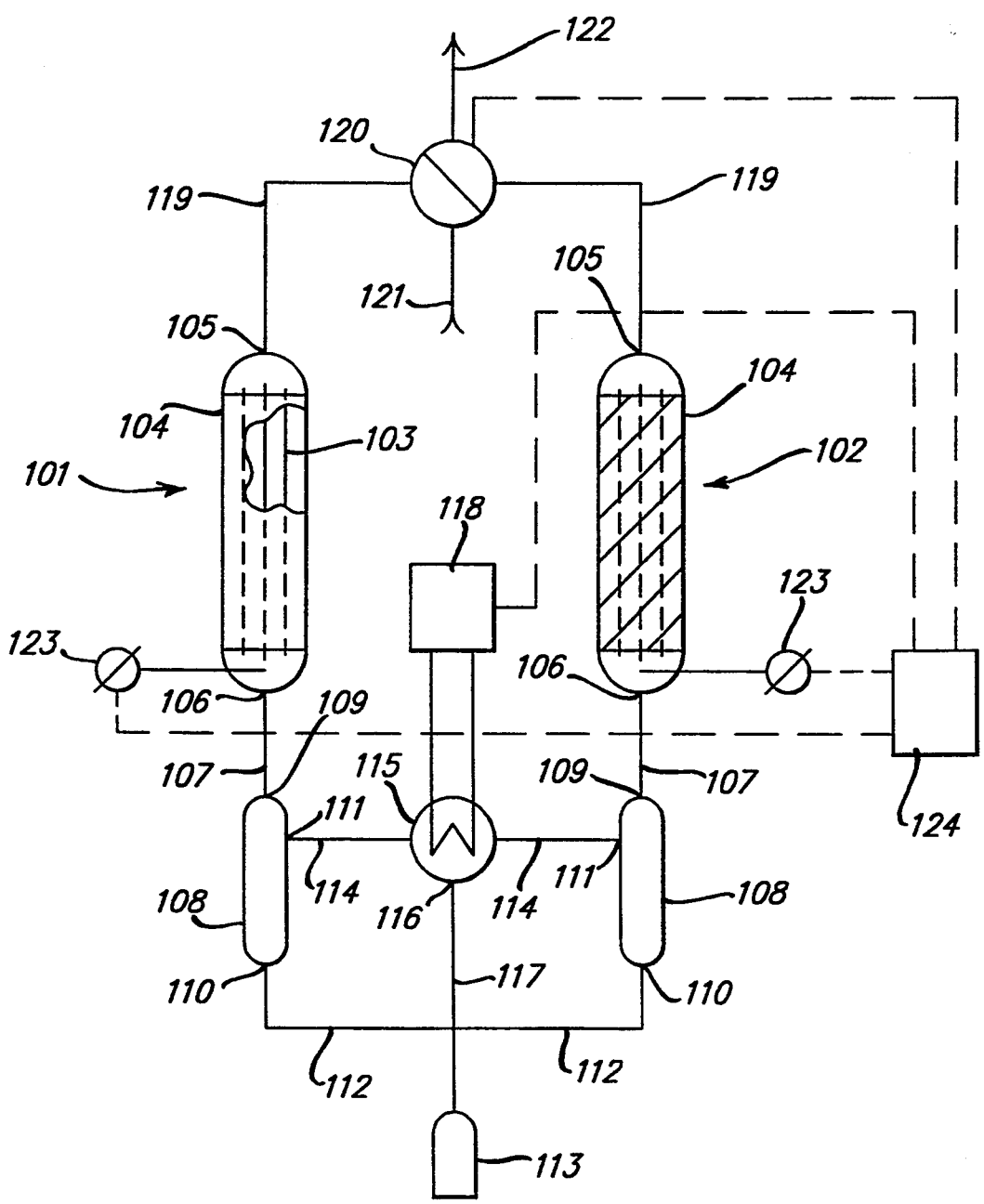
FIG. 1 depicts a diagram of the present invention at the starting point in the operating cycle.
Figure 2:
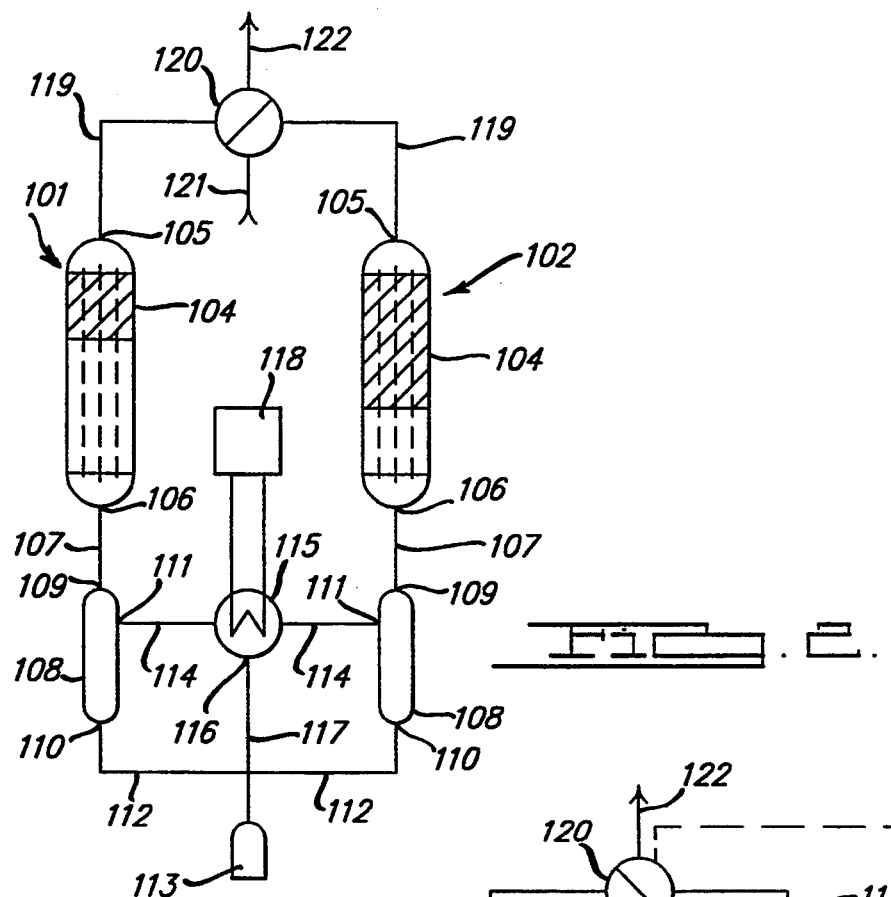
FIG. 2 depicts a diagram of the present invention at an intermediate point in the operating cycle.

The present invention is shown in FIGS. 1 and 2 and has two regenerators (101 and 102). The regenerators comprise of a solid heat exchange media (103) with a plurality of internal passages or pores to allow the vapor-gas mixture to pass through. The heat exchange media (103) are contained in airtight housings (104) which are equipped with one opening or port at the top (105) and one opening or port at the bottom (106). The shape and size of the passages or pores in the heat exchange media are such that the vapor-gas mixture passing through the regenerator makes intimate contact with the solid material. This promotes high rates of heat transfer from the heat transfer media to the vapor-gas mixture. In the preferred embodiment the flow through each regenerator is in the vertical direction.

The opening at the bottom of each regenerator (106) is connected by a conduit (107) to a phase separator (108) of conventional design and construction. The phase separator receives the gas and condensed vapors from the regenerator through its entry opening (109) and directs any liquids by gravity flow through the liquid opening (110) and any gases through the gas opening (111). The liquid opening from the phase separators (110) are connected by conduit (112) to a vessel (113) for collecting and storing the condensed vapors. The gas openings (111) from the phase separators (108) are connected by conduit (114) to a heat exchanger (115). The heat exchanger (115) is equipped with a drain (116) to direct any vapors which condense in the heat exchanger (115) in to the collection vessel (113) by way of a conduit (117) and is cooled by a refrigeration plant (118) of conventional design and construction. The opening at the top of each regenerator (105) is connected by conduit (119) to a valve arrangement (120) which can open the top of the regenerator either to the source of the vapor gas mixture (121) or to the vent for the treated gas (122). The source of the vapor gas mixture (121) is at a greater pressure than the vent for the treated gas (122) such that the vapor gas mixture flows through the apparatus. The valve arrangement (120) is of design such that when the opening at the top of one regenerator (105) is connected to the pressurized vapor gas mixture source (121) the opening at the top of the other regenerator is connected to the vent for the treated gas (122). The valve arrangement (120) may be a plurality of simple two position valves or a single valve capable of all of the switching functions. In any instance the valve design and construction may be conventional.

One or more temperature sensors (123) are located at some point. The temperature sensors, which may be conventional in design and construction, put out an electrical signal to a control system (124). The control system utilizes the input from the temperature sensors (123) and controls the valve arrangement (120) and possibly the refrigeration plant (118).

Figure 3:
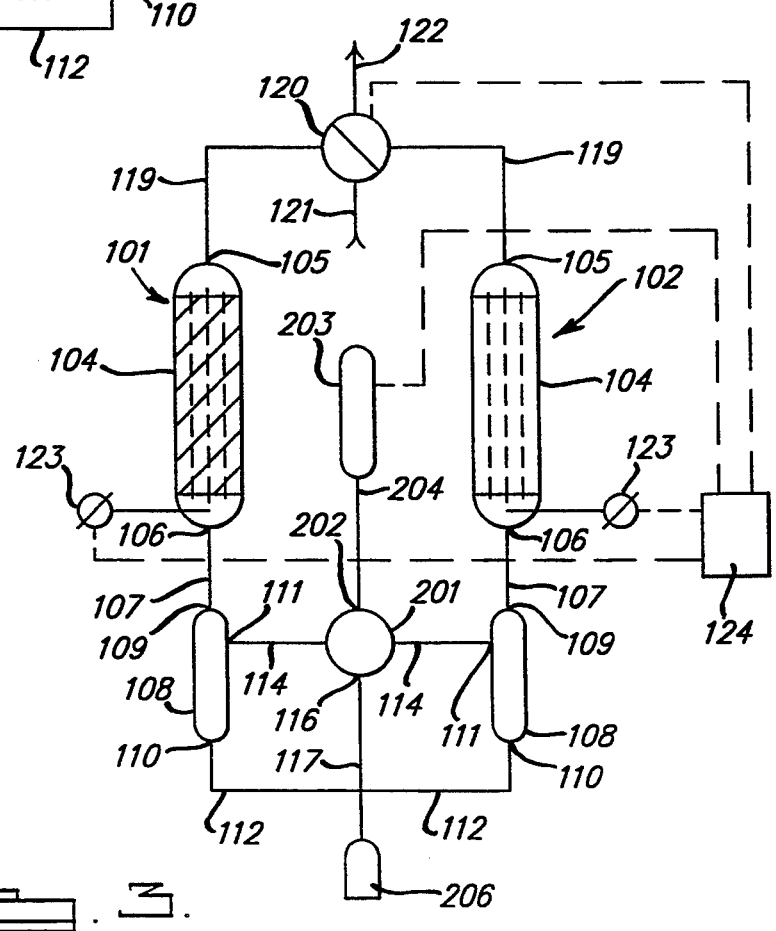
FIG. 3 depicts an alternate embodiment of the present invention having a different supplemental cooling system.

An alternate embodiment of the present invention is shown in FIG. 3 wherein the operation is essentially the same as the FIG. 1 embodiment except the heat exchanger (115) and refrigeration plant (118) are replaced by a manifold (201) and a fluid coolant source (203). In this embodiment the gas openings (111) from the phase separators (108) are connected by a conduit (114) to a manifold (201). The manifold has one or more coolant openings (202). A coolant source (203) is connected by a conduit (204) to the coolant openings (202) in the manifold (201). The coolant, which may be liquid nitrogen, enters the manifold and cools of the vapor-gas mixture by mixing with the vapor-gas mixture. The coolant source (203) is capable of delivering a coolant gas or liquid at a controlled rate to the coolant opening (202) in the manifold (201). The coolant source (203) is of conventional design and construction. In this embodiment the control system (124) may control the flow of coolant from the coolant source (203).

The system operates by the following sequence. The system configuration at the start of the sequence is shown in FIG. 1. At the start of the sequence one of the regenerators (102), in its warming cycle, is at the same temperature as the vapor-gas mixture, hereafter referred to as the warm temperature, and the other regenerator (101), in its cooling cycle, is cooled to a temperature below the dew point of the vapor in the vapor-gas mixture, hereafter referred to as the cool temperature. Portions of the regenerators at the warm temperature are shown hatched on FIGS. 1 and 2 and the portions of the regenerators at the cool temperature are shown unhatched in FIGS. 1 and 2. The valve arrangement (120) allows vapor gas mixture from the pressurized source (121) to enter the regenerator in its cooling cycle (101) and cleaned gases exiting from the top of the regenerator in its warming cycle (102) to exit to the vent (122).

At the start of the operating cycle the vapor-gas mixture enters the top of the regenerator in its cooling cycle (101) and travels downward. As it flows through the regenerator heat is exchanged from the heat transfer media (103) to the warm vapor-gas mixture. This causes a cooling of the vapor-gas mixture as it travels downward through the regenerator. At some point within the regenerator the temperature of the vapor-gas mixture drops below the dew point of the vapor and the vapor condenses on the heat transfer media as a liquid or solid. When the vapor-gas mixture exits the bottom of the regenerator in its cooling cycle (101) the gas has been cleaned of substantially all of the vapors and cooled to substantially the same temperature as the cool regenerator. The vapors from the vapor-gas mixture are collected within the regenerator as a liquid or solid.

The purified gas exits the regenerator in its cooling cycle (101) and enters the bottom of the regenerator on its warming cycle (102) by way of the phase separators (108) and heat exchanger (115). The latter cools the gas to essentially the initial cool temperature of the regenerator in the warming cycle and completes the condensation of vapors that were not condensed by the regenerator in the warming cycle. Because the temperature of the gas entering the heat exchanger (115) is substantially the same as the cool temperature the cooling load on the cooling plant (118) is very low. The purified gases travel upward through the regenerator on its warming cycle (102) and heat is transferred from the warm regenerator to the cool gases. This causes the gases to warm as they travel upward through the regenerator on its warming cycle (102). The now purified and warmed gases then exit the system through the valve arrangement (120) and to the gas vent (122).

The system configuration after the process has continued for some time is shown in FIG. 2. A portion of the regenerator in its cooling cycle (101) has been warmed at the point where the vapor-gas mixture is entering and a portion of the regenerator in its warming cycle (102) has been cooled where the cool purified gases are entering. The warmed area of the regenerator on its cooling cycle (101) grows with time as heat is transferred from the vapor-gas mixture and the cooled area of the regenerator on its warming cycle (102) grows as heat is transferred from the cool purified gas. As the warmed portion of the originally cool regenerator grows the vapors that had earlier condensed in that portion either run downward by gravity as a liquid into the still cool lower portion of the regenerator or are re-vaporized and carried downward by the vapor-gas mixture to the still cool lower portion of the regenerator on its cooling cycle (101) where they recondense.

This process continues until the regenerator on its cooling cycle becomes completely warmed. Because extra heat is transferred to the regenerator on its cooling cycle (101) to cool and condense the vapors the regenerator on its cooling cycle becomes completely warmed before the regenerator on its warming cycle (102) becomes completely cooled. At this time the condensed vapors which have been collecting and traveling downward through the regenerator on its cooling cycle (101) just ahead of the warmed zone reach the lower end of the regenerator. As the last portion of the regenerator is warmed these condensed vapors emerge from the bed in a liquid, solid or gaseous (vapor) form. The liquefied or solidified vapors move under the influence of gravity and gas flow downward into the phase separator (108) and are directed into the collection vessel (113). The warm vapor-gas mixture exiting from the originally cooled regenerator are now cooled within the heat exchanger (115) prior to entering the originally warm regenerator. The vapor which emerges in a gaseous form from the regenerator on its cooling cycle (101) and associated phase seperator (108) condenses within the heat exchanger (115) and runs downward through a drain (116) into the collection vessel (113).

After the regenerator on its warming cycle is completely cooled the positions of the valves are then reversed and the cycle begins again with the vapor-gas mixture flowing in the opposite direction as shown in FIG. 3.

At the time the valve arrangement switches the vapor portion of the vapor-gas mixture contained in the volume of the regenerator just finishing its cooling cycle and the conduit between the valve system and that regenerator will not have been collected because that volume of gas will never have been cooled below its initial temperature. This vapor will escape collection in the system because after the valve arrangement is switched it will be swept to the vent by the pressurized gasses now flowing upward through the regenerator formerly on the cooling cycle. One means of collecting this fraction of vapor is to incorporate a third regenerator and associated phase separator into the system design. With this modification the regenerator finishing its cooling cycle would be switched to a purge cycle and the third regenerator, which has just completed its purge cycle becomes the regenerator on the warming cycle. In the purge cycle a separate valve opens and purified gas from the system vent or from some other source of purified gas is directed downward under pressure through the regenerator having just finished its cooling cycle. The volumetric flow rate of this purge gas much lower than the main gas flow through the apparatus such it has little effect on the normal thermal operation. This purging sweeps the untreated vapor-gas mixture contained in the regenerator volume into the heat exchanger where the vapor fraction may be collected. In this way when the regenerator is switched to its warming cycle the volume of gas contained within it will contain no uncondensed vapors.

What is claimed is:

1. Means for removing a condensable vapor from a pressurized mixture of said vapor and another gas, said means comprising the combination of:
    A) two similar systems operative alternately in cooling and heating cycles such that when one of said systems is in a cooling cycle, the other is in a heating cycle,
    B) each system comprising a regenerator and an associated phase separator,
    C) each regenerator having first and second openings spaced by heat exchange means,
    D) each phase separator having first, second, and third openings,
    E) said combination also comprising supplemental cooling means, storage means, and valve means,
    F) said valve means being selectively operative for connecting said first opening of each regenerator during its cooling cycle with said pressurized mixture and for connecting said first opening of each regenerator during its heating cycle with vent means,
    G) each regenerator during its cooling cycle comprising
        a) means for conducting said mixture in the direction from its first to its second opening in heat exchange relation with its heat exchange means for cooling said gas and condensing said vapor, whereby warming of its heat exchange means from an initial cold temperature to the temperature of the incoming mixture gradually progresses in the said direction from adjacent to said first opening, and
        b) means for discharging the cooled gas and vapor condensate from its second opening,
    H) each phase separator during its cooling cycle comprising
        a) means for receiving said cooled gas and condensate at its first opening,
        b) means for conduction said condensate through its second opening to said storage means, and
        c) means for discharging the cooled gas and uncondensed vapor through its third opening,
    I) said supplemental cooling means communicating with the third opening of both phase separators comprising
        a) means for receiving the cooled gas and any uncondensed vapor discharged through the third opening of the phase separator in its cooling cycle,
        b) means for cooling and condensing said uncondensed vapor and for cooling the remaining cooled gas therein essentially to said initial cold temperature,
        c) means for conducting the condensate of said uncondensed vapor to said storage means, and
        d) means for discharging said remaining gas to the third opening of the phase separator in the heating cycle,
    J) each phase separator during its warming cycle comprising means for receiving through its third opening said remaining gas from said supplemental cooling means and conducting said remaining gas through its first opening to the second opening of the regenerator in the warming cycle,
    K) each regenerator during its warming cycle comprising means for conducting said remaining gas in the direction from its second opening to its first opening in heat exchange relation with its heat exchange means, whereby cooling of its heat exchange means to said initial temperature of said remaining gas gradually progresses in the last named direction from adjacent to its second opening.

2. The combination according to claim 1 wherein said regenerator, heat exchange means, and phase separator are elongated vertically, said first and second openings of said regenerator and phase separators being adjacent to the upper and lower ends thereof respectfully.

3. The combination according to claim 2, said means in paragraph I) subpart b) comprising means for supplying controlled amounts of a volatile liquid refrigerant, at a temperature below said initial temperature, to said means for receiving in subparagraph a) of paragraph I).

4. The combination according to claim 1, said valve means being responsive to the temperature of one of said systems for determining the end of each cycle and for interchanging the connections of said systems with said mixture and vent means at the end of each cycle.

5. A method for removing condensable vapor from a mixture of said vapor and another gas, said method comprising the steps of
    A) providing two similar elongated heat exchangers,
    B) providing one of said heat exchangers at an initial cold temperature and the other at an initial warm temperature,
    C) cooling said mixture, condensing said vapor, and progressively warming the initial cold elongated heat exchanger from one end thereof to its opposite end by conducting said mixture in heat exchange relation with said cold heat exchanger from said one end to said opposite end, D) collecting the condensate from the condensed vapor E) discharging from the cold heat exchanger the cooled gas and any lo remaining uncondensed vapor in said cooled gas, F) additionally cooling and condensing said remaining vapor and additionally cooling the cooled gas discharged from the cold heat exchanger to said initial cold temperature, G) collecting the condensate from said remaining vapor, H) warming said additionally cooled gas and progressively cooling the initial warm elongated heat exchanger from one end thereof to its opposite end by conducting said additionally cooled gas in heat exchange relation with said warm heat exchanger from said one end to said opposite end, I) venting the gas from said initially warm heat exchanger, J) continuing the process of steps C) through H) until said one elongated heat exchanger attains said initial warm temperature and said other elongated heat exchanger attains said initial cold temperature, K) thereafter repeating said process with said one and said other heat exchanger being said warm and cold heat exchangers respectively.

* * * * *